(12) United States Patent
Wu et al.

(10) Patent No.: US 11,204,742 B1
(45) Date of Patent: Dec. 21, 2021

(54) MULTI-OBJECTIVE EXPERIMENTS WITH DYNAMIC GROUP ASSIGNMENT

(71) Applicant: Electronic Arts Inc., Redwood City, CA (US)

(72) Inventors: Meng Wu, Fremont, CA (US); John Kolen, Half Moon Bay, CA (US); Navid Aghdaie, Redwood City, CA (US); Kazi Atif-Uz Zaman, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 490 days.

(21) Appl. No.: 15/940,814

(22) Filed: Mar. 29, 2018

(51) Int. Cl.
G06F 8/38 (2018.01)
G06Q 30/02 (2012.01)

(52) U.S. Cl.
CPC .......... G06F 8/38 (2013.01); G06Q 30/0201 (2013.01)

(58) Field of Classification Search
CPC .............................. G06F 8/38; G06Q 30/0201
See application file for complete search history.

(56) References Cited

U.S. PATENT DOCUMENTS

| 8,706,733 B1* | 4/2014 | Yeskel | G06Q 10/10 707/737 |
| 10,223,653 B1* | 3/2019 | Song | G06Q 10/063118 |
| 2007/0168057 A1* | 7/2007 | Blevins | G05B 13/022 700/53 |
| 2009/0007074 A1* | 1/2009 | Campion | G06F 11/3668 717/124 |
| 2012/0192012 A1* | 7/2012 | Lin | G06F 11/2221 714/42 |

(Continued)

OTHER PUBLICATIONS

"Software Defect Identification Using Machine Learning Techniques", by Evren Ceylan, F. Onur Kutlubay, Ayse B. Bener, Computer Engineering Department Istanbul, Turkey, Proceedings of the 32nd EUROMICRO Conference on Software Engineering and Advanced Applications (EUROMICRO-SEAA'06), IEEE, 2006. (Year: 2006).*

(Continued)

*Primary Examiner* — Pan G Choy
(74) *Attorney, Agent, or Firm* — McDermott Will & Emery LLP

(57) ABSTRACT

Methods for providing multi-objective experiments with dynamic group assignment are provided. In one aspect, a method includes receiving, from a configuration component of an experiment management system, a plurality of objectives and at least one constraint for an experiment. The method also includes assigning a test population of the experiment into a plurality of groups. The method also includes determining a progress summary that predicts completion rates for the plurality of objectives according to the at least one constraint. The method also includes modifying a prioritization of the plurality of objectives to optimize the predicted completion rates. The method also includes receiving a request to add additional users into the test population. The method also includes distributing the additional users into the plurality of groups according to the modified prioritization. Systems and machine-readable media are also provided.

19 Claims, 7 Drawing Sheets

(56) References Cited

U.S. PATENT DOCUMENTS

| | | | |
|---|---|---|---|
| 2013/0073475 A1* | 3/2013 | Kinkaid | G06Q 10/10 |
| | | | 705/319 |
| 2013/0174178 A1* | 7/2013 | Chakraborty | G06F 11/3672 |
| | | | 718/105 |
| 2014/0033223 A1* | 1/2014 | Swart | G06F 9/5066 |
| | | | 718/105 |
| 2016/0077880 A1* | 3/2016 | Santos | G06Q 10/0631 |
| | | | 718/104 |

OTHER PUBLICATIONS

"A Genetic Algorithm for Assigning Individuals to Populations Using Multi-locus Genotyping—Simulated Evolution and Learning", by Kalyanmoy Deb et al., 8th International Conference, SEAL 2010, Kanpur, India, Dec. 2010 Proceedings. (Year: 2010).*

* cited by examiner

MULTI-OBJECTIVE EXPERIMENTS WITH DYNAMIC GROUP ASSIGNMENT

TECHNICAL FIELD

The present disclosure generally relates to conducting experiments, and more specifically relates to multi-objective experiments with dynamic group assignment.

BACKGROUND

When designing an application, many competing goals or objectives may need to be considered for the design. It is often difficult for designers to provide a balanced design for the application when beginning design of the application. Experiment management systems (EMS) can be used to experiment with various changes to the application using a test audience. Based on user data and other feedback collected from the test audience by the EMS, adjustments can be made to the application to reach desired objectives for the application in an optimized manner. However, the parameters of the EMS are often set manually and adjusted manually as an experiment progresses. This manual adjustment can be prone to error and can cause experiments to miss deadlines and provide less reliable results, particularly for more complex experiments that need to consider multiple objectives.

The description provided in the background section should not be assumed to be prior art merely because it is mentioned in or associated with the background section. The background section may include information that describes one or more aspects of the subject technology.

SUMMARY

The disclosed system multi-objective experiments with dynamic group assignment. A user interface is provided that allows a user to set objectives and constraints for an experiment to be run in an EMS for an application. A test population for the experiment is divided into groups to test the objectives. As the experiment progresses, a periodic summary report may be generated that predicts completion rates for the objectives. To optimize for completion of all of the objectives within the constraints, a prioritization of the objectives is modified according to the periodic summary report. New users that are added to the test population can be dynamically assigned into one of the groups based on the modified prioritization, thereby providing additional users where needed to complete as many objectives as possible within the given constraints.

According to certain aspects of the present disclosure, a computer-implemented method is provided. The method includes receiving, from a configuration component of an experiment management system, a plurality of objectives and at least one constraint for an experiment. The method also includes assigning a test population of the experiment into a plurality of groups. The method also includes determining a progress summary that predicts completion rates for the plurality of objectives according to the at least one constraint. The method also includes modifying a prioritization of the plurality of objectives to optimize the predicted completion rates. The method also includes receiving a request to add additional users into the test population. The method also includes distributing the additional users into the plurality of groups according to the modified prioritization.

According to certain aspects of the present disclosure, a system is provided including a memory, and a processor configured to execute instructions. When executed, the instructions cause the processor to receive, from a configuration component of an experiment management system, a plurality of objectives and at least one constraint for an experiment. The instructions also cause the processor to assign a test population of the experiment into a plurality of groups. The instructions also cause the processor to provide an application for the test population that is customized for each of the plurality of groups. The instructions also cause the processor to determine a progress summary that predicts completion rates for the plurality of objectives according to the at least one constraint, wherein determining the progress summary is based on user actions in the application for each of the plurality of groups. The instructions also cause the processor to modify a prioritization of the plurality of objectives to optimize the predicted completion rates. The instructions also cause the processor to receive a request to add additional users into the test population. The instructions also cause the processor to distribute the additional users into the plurality of groups according to the modified prioritization.

According to certain aspects of the present disclosure, a non-transitory machine-readable storage medium is provided that includes machine-readable instructions for causing a processor to execute a method. The method includes receiving, from a configuration component of an experiment management system, a plurality of objectives and at least one constraint for an experiment. The method also includes assigning a test population of the experiment into a plurality of groups based on the plurality of objectives. The method also includes providing an application for the test population that is customized for each of the plurality of groups. The method also includes determining a progress summary that predicts completion rates for the plurality of objectives according to the at least one constraint, wherein determining the progress summary is based on user actions in the application for each of the plurality of groups. The method also includes modifying a prioritization of the plurality of objectives to optimize the predicted completion rates. The method also includes receiving a request to add additional users into the test population. The method also includes distributing the additional users into the plurality of groups according to the modified prioritization, wherein the determining, the modifying, the receiving, and the distributing are performed on a periodic basis.

According to certain aspects of the present disclosure, a system is provided. The system includes means for receiving, from a configuration component of an experiment management system, a plurality of objectives and at least one constraint for an experiment. The system includes means for assigning a test population of the experiment into a plurality of groups. The system includes means for determining a progress summary that predicts completion rates for the plurality of objectives according to the at least one constraint, for modifying a prioritization of the plurality of objectives to optimize the predicted completion rates, for receiving a request to add additional users into the test population, and for distributing the additional users into the plurality of groups according to the modified prioritization.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
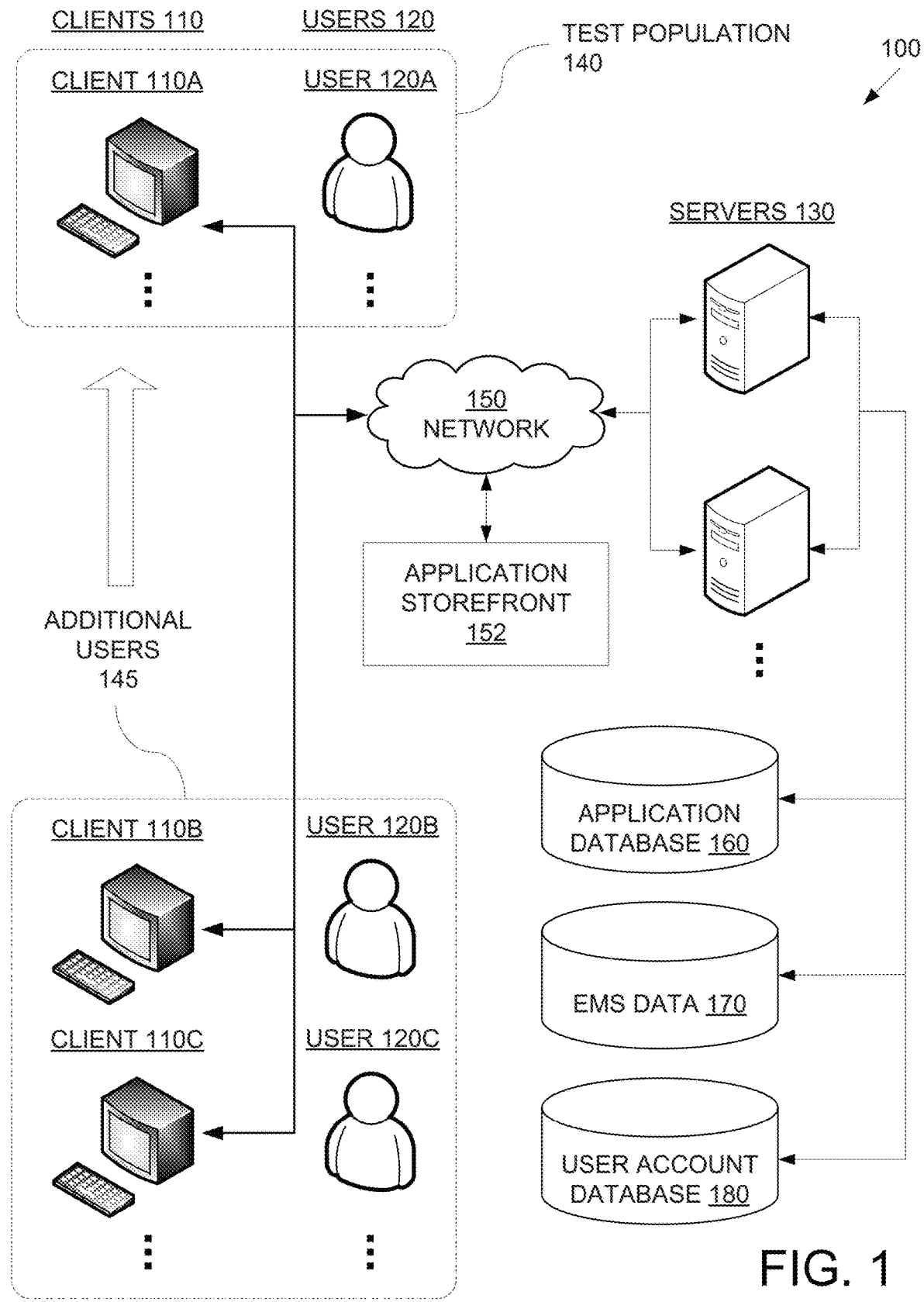
FIG. 1 illustrates an example architecture for providing multi-objective experiments with dynamic group assignment.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

As discussed above, an EMS is often manually configured by a user, for example by manually dividing a test population into A-B testing groups and performing a series of comparison tests. The experiment operator must remember to diligently check the results of the experiment and make daily changes to proceed through desired objectives of the experiment. This manual adjustment can be prone to error and can cause experiments to miss deadlines and provide less reliable results. Optimizing an EMS for complex application software such as video games that have multiple objectives remains a difficult, error prone, and time consuming task. Thus, there is a need for a way to perform multi-objective experiments that is easy for the experiment operator while providing quick and accurate results.

The disclosed system provides multi-objective experiments with dynamic group assignment. Rather than forcing the test operator to manually divide a test population into A-B testing groups, the test operator only needs to specify objectives and constraints in a user interface of an EMS. Based on machine learning or other techniques, the EMS may automatically generate a division of the test population into appropriately sized groups to complete the specified objectives, for example by providing a customized application for testing and data gathering within each group. Periodically, for example hourly, the EMS performs a dynamic group assignment for the groups that reprioritizes the objectives and directs new users into appropriate groups to optimize for a highest completion rate of the objectives while meeting the specified constraints.

The disclosed system addresses a technical problem tied to computer technology and arising in the realm of computer networks, namely the technical problem of providing multi-objective experiments with dynamic group assignment. This is a technical problem related to performing experiments for applications, or more specifically related to performing experiments addressing multiple objectives of an application in an automated fashion. The disclosed system solves this technical problem with a technical solution, namely by continuously or periodically reevaluating the progress of an experiment to reorder objective priorities for optimized completion rates and by dynamically assigning new users to testing groups according to the reordered priorities.

By automating the process of dividing the test population into appropriate testing groups, much of the ad-hoc guesswork and gut based decisions for manually generating A-B comparison groups can be bypassed in favor of a more rigorous approach to group assignments according to historical data, such as by training a machine learning algorithm on historical experiment training data. Moreover, since the group assignments can be automated in such a manner, the group assignments can be readily adjusted according to experiment progress reports carried out on a periodic basis to reorder a prioritization of objectives for the experiment. By setting appropriate target size allocations for each testing group to funnel new users into the groups, objectives that need the additional confidence from the larger sample size can complete more quickly to meet the specified constraints. In this manner, the experiment may be optimized to complete as many assigned objectives as possible.

Since the disclosed system provides for the completion of as many assigned objectives as possible within provided constraints such as a deadline for the experiment, add-on experiments that would normally be necessary to follow up on missed objectives may be skipped completely. Since the EMS can continually monitor the progress of the experiment and perform prioritization adjustments automatically, the experiment may complete much more quickly than an operator led experiment where daily results are observed and new tests are manually created. As the experiment can be completed in reduced time, various computing resources can be conserved such as processing cycles, network load, bandwidth usage, storage footprint, memory footprint, and others. Accordingly, functioning of the computer itself is improved by using computational resources in an efficient manner.

Although certain examples provided herein may describe a user's account data being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for multi-objective experiments with dynamic group assignment. The architecture 100 includes clients 110 and servers 130 connected over a network 150. Servers 130 may access various data stores including application database 160, EMS data 170, and user account database 180, for example over a local intranet. In some aspects of the subject technology, servers 130 may instead access the data stores over network 150. Users 120 may interact with respective clients 110. Client 110A associated with user 120A may be part of test population 140, whereas client 110B and 110C associated with additional users 120B and 120C may be added to test population 140. Additional clients and associated users may be included that are not specifically shown in FIG. 1. Further, while clients and users are shown in a 1:1 association, users may be associated with multiple clients.

It may be assumed that each of clients 110 have already obtained an application that will be used for conducting experiments, for example by downloading the application via application storefront 152. The application may be registered with a user account in user account database 180, allowing users 120 to use the application across all clients associated with the user account. While the application may be customized for each group and/or user during the experiment, it should be noted that the actual application may be the same binary application for each client. For example, the application may already include all possible testing features and configuration settings, and each client may simply contact servers 130 to determine which features to turn on/off or how to set the configuration settings.

The clients 110 may each execute a separate instance of the downloaded application, such as a video game. The clients in test population 140 may correspond to clients associated with end users of the application, and may be participating in a closed or open beta of the application, or may be executing a release version of the application. Before clients 110 are added to test population 140, permission to participate in an experiment may be solicited and received from the associated users 120. Thus, participation in experiments may be voluntary with user consent.

One of the clients 110 may be used as an administrator terminal to log into one of servers 130 to configure the EMS and start an experiment for the application. After initial parameters in the form of objectives and constraints are provided and the experiment is started, the servers 130 may select a test population 140 from a general user population of the application and divide the test population 140 into groups according to the experiment objectives. As additional users 145 download the application from application storefront 152, the EMS running on servers 130 may assign the additional users 145 into one of the groups to accelerate a respective experiment objective. Target size allocations for each group may be based on a prioritization of the objectives that is periodically updated during the experiment. Once the constraints of the experiment can no longer be met, for example by going past a specified deadline, the experiment may end and a report may be output for all the objectives.

The clients 110 can be any device having an appropriate processor, memory, and communications capability for executing the application. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities.

One of the many servers 130 is configured to host an EMS and/or an application service for hosting the application. For the purposes of load balancing, multiple servers 130 can host the EMS and/or application service. In certain aspects, one or more of the servers 130 can be a cloud computing server of an infrastructure-as-a-service (IaaS), and be able to support a platform-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
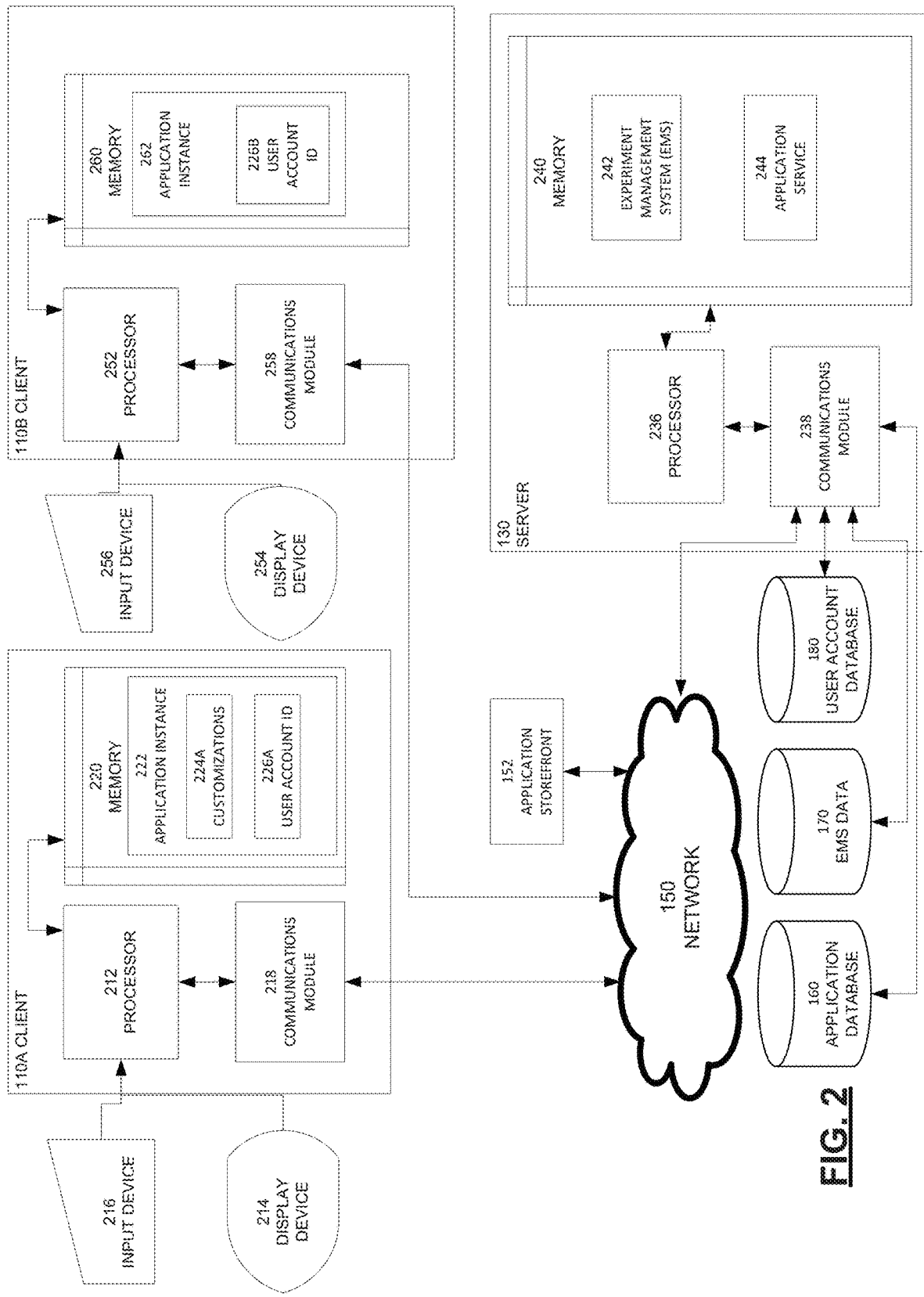
FIG. 2 is a block diagram illustrating the example clients and servers from the architecture of FIG. 1 according to certain aspects of the disclosure.

Example System for Providing Multi-Objective Experiments with Dynamic Group Assignment FIG. 2 is a block diagram illustrating an example server 130, client 110A and client 110B from the architecture of FIG. 1 according to certain aspects of the disclosure. The client 110A, client 110B, and server 130 are connected over the network 150 via respective communications modules 218, 258, and 238. The communications modules 218, 258, and 238 are configured to interface with the network 150 and to receive information, such as data, requests, responses, and commands to other devices on the network, such as application storefront 152, application database 160, EMS data 170, and user account database 180. The communications modules 218, 258, and 238 can be, for example, modems or Ethernet cards.

An end user client, or client 110A, is associated with user 120A and includes processor 212, communications module 218, and memory 220. The client 110A also includes an input device 216, such as a keyboard or mouse, and a display device 214. The processor 212 of the client 110A is configured to execute instructions, such as instructions physically coded into the processor 212, instructions received from software in memory 220, or a combination of both.

For example, processor 212 of client 110A may execute application instance 222, corresponding to an instance of a video game application. Since client 110A is part of test population 140 and may be a member of a particular testing group, application instance 222 may be provided with customizations 224A based on user account ID 226A, which identifies client 110A as being associated with user 120A.

Similarly, another end user client, or client 110B, is associated with user 120B and includes processor 252, communications module 258, and memory 260. The client 110B also includes an input device 256, such as a keyboard or mouse, and a display device 254. The processor 252 of the client 110B is configured to execute instructions, such as instructions physically coded into the processor 252, instructions received from software in memory 260, or a combination of both.

Processor 252 of client 110B may execute application instance 262, corresponding to an instance of the same video game application being executed by client 110A. Since client 110B is part of additional users 145 and is not yet part of test population 140, application instance 262 may not yet be provided with any customizations. Thus, application instance 262 operates normally as part of the general user population outside of the experiment. However, if user 120B is given the opportunity to participate in the experiment and agrees to do so, then application instance 262 may receive customizations similar to application instance 222. Further, user account ID 226B identifying client 110B as being associated with user 120B may be stored in EMS data 170 for assigning into one of several testing groups, as discussed in further detail below.

Although not specifically shown in FIG. 2, other users and associated clients may also be in communication with servers 130 over network 150. The other clients may include components similar to those shown in client 110A and client 110B in FIG. 2.

Server 130 includes processor 236, communications module 238, and memory 240, which includes experiment management system (EMS) 242 and application service 244. The processor 236 of the server 130 is configured to execute instructions, such as instructions physically coded into the processor 236, instructions received from software in memory 240, or a combination of both. While server 130 is shown as including both EMS 242 and application service 244, each server 130 may be dedicated to running only EMS 242 or only application service 244.

For example, the processor 236 of the server 130 executes instructions in EMS 242 to receive, from a configuration component of EMS 242, a plurality of objectives and at least one constraint for an experiment. The objectives may be goals with respect to the application being tested in the experiment, for example increasing game session duration or increasing user retention for the application. The constraints may be limitations on the experiment, for example a deadline to provide results or a maximum percentage or number of users to include in test population 140.

Processor 236 may assign test population 140 into a plurality of groups. For example, the groups may be organized based on the received plurality of objectives. As discussed above, machine learning techniques may be used to determine an appropriate size for each of the groups to achieve a high confidence result in a minimum testing time. Thus, in some aspects of the subject technology, processor 236 may assign the test population into the plurality of groups based on meeting a minimum confidence level for each of the plurality of objectives. The group assignments may be stored in EMS data 170.

Processor 236 may provide an application for test population 140 that is customized for each of the plurality of groups. For example, each of the clients 110 running an application instance may query EMS 242 with an associated user account ID. In response, EMS 242 may consult EMS data 170 to determine a group assignment for the user account ID and determine appropriate customizations that are then sent back to the respective clients 110 for applying in each application instance. As a result, each application instance in test population 140 is customized for each of the plurality of groups.

Processor 236 may determine a progress summary that predicts completion rates for the plurality of objectives according to the at least one constraint, wherein determining the progress summary is based on user actions in the application for each of the plurality of groups. As the experiment is in progress, EMS 242 may gather data from user interactions with the customized application instances and perform data analysis to generate results for answering the original objectives. Based on past history, e.g. by machine learning methods, and based on the current progress of the experiment and the experiment data already gathered, EMS 242 can predict whether each of the objectives can be completed within the provided constraints, e.g. a results deadline.

The completion of an objective may be defined as arriving at a statistically valid conclusion concerning the objective, wherein statistically valid may mean meeting a minimum confidence level for providing a recommendation concerning the objective. For example, with respect to the objective "improve day 7 retention," gathered data during the experiment may indicate that users are abandoning the game due to the game mechanics being too simple, and users appear to be migrating to a rival game application with greater complexity. Accordingly, a recommendation may be provided that "modifying the game mechanics to provide 30% more depth will retain 25% more users with a 95% confidence level." Here, a minimum confidence level may be set to 90% for example, which indicates that EMS 242 will only mark an objective as complete if a recommendation can be provided for the objective with a 10% or less chance that the recommendation is incorrect.

Processor 236 may modify a prioritization of the plurality of objectives to optimize the predicted completion rates. For example, if one or more objectives appear to be not on track to complete according to the progress summary, then the prioritization of the objectives may be reordered to optimize towards completing as many objectives as possible. In some aspects of the subject technology, processor 236 is configured to modify the prioritization based on meeting a minimum confidence level for each of the plurality of objectives.

Processor 236 may receive a request to add additional users 145 into test population 140. For example, each client in additional users 145 may download the application in application storefront 152 and agree to participate in the ongoing experiment. The clients in additional users 145 may then send a request EMS 242 to assign the associated user account IDs into the experiment.

Processor 236 may distribute additional users 145 into the plurality of groups according to the modified prioritization. For example, if the progress summary indicates that an objective C associated with a group B is not likely to complete within the given constraints, then the modified prioritization may order the objective C as a higher priority within the objectives. As a result, a larger proportion of additional users 145 may be assigned to group B so that the objective C is more likely to complete on time. For example, processor 236 may determine a target population level for each group based on the modified prioritization and assign additional users 145 into the groups proportionally based on the targets. In some aspects of the subject technology, additional groups may also be newly created for the experiment when distributing the additional users 145.

In some cases, it may be counterproductive to spread users too thinly across the groups in an attempt to test too many objectives at once, and a staggered or sequential testing approach may be more effective. Thus, in some aspects of the subject technology, processor 236 may distribute the additional users 145 for a maximum number of priority objectives in the modified prioritization.

In some aspects of the subject technology, the processor 236 is configured to repeat the determining of the progress summary, the modifying of the prioritization, the request to add additional users 145, and the distributing of additional users 145 on a periodic basis. For example, these steps may be repeated on an hourly basis or some other time schedule.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3A:
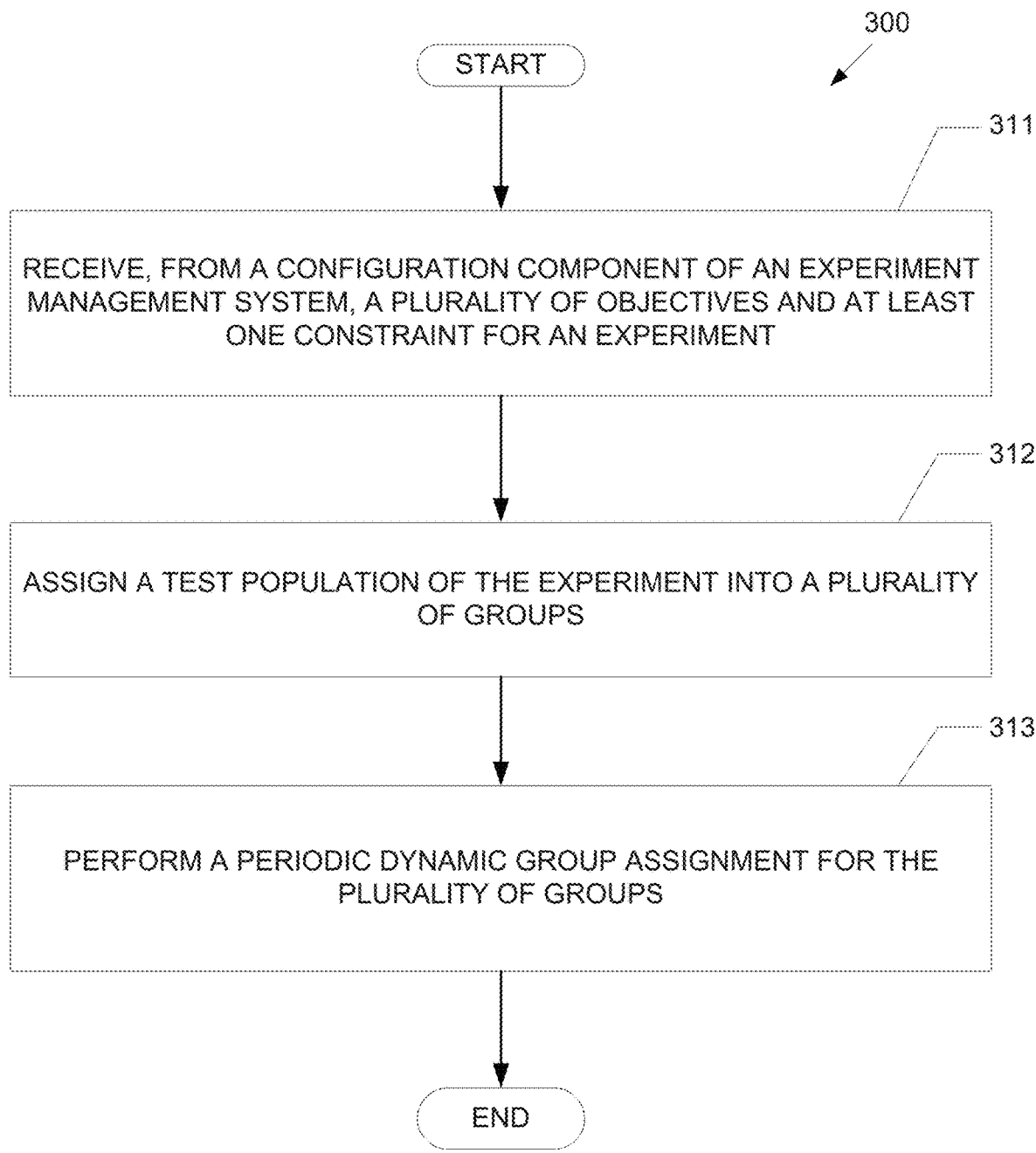
FIG. 3A illustrates an example process for providing multi-objective experiments with dynamic group assignment using an example server of FIG. 2.

FIG. 3A illustrates an example process 300 for providing multi-objective experiments with dynamic group assignment using an example server 130 of FIG. 2. While FIG. 3A is described with reference to FIG. 2, it should be noted that the process steps of FIG. 3A may be performed by other systems.

Figure 4A:
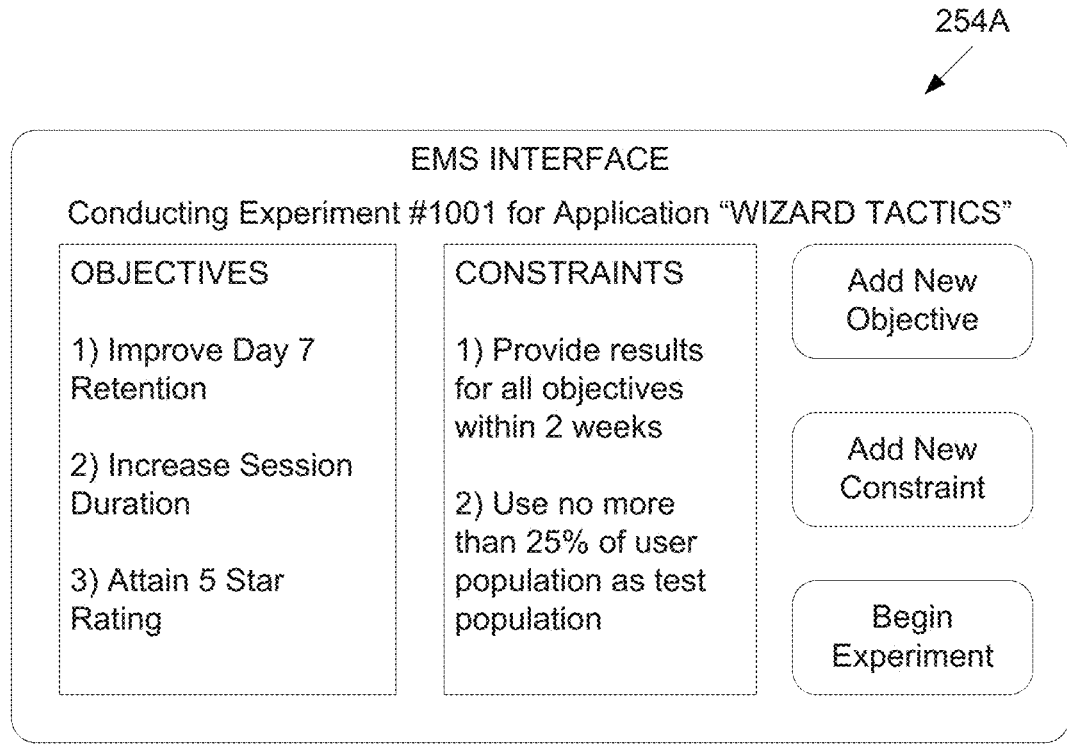
FIG. 4A and FIG. 4B illustrate example user interfaces of an experiment management system (EMS) for providing multi-objective experiments with dynamic group assignment.

The process 300 begins by proceeding to step 311, where processor 236 of server 130 may receive, from a configuration component of EMS 242, a plurality of objectives and at least one constraint for an experiment. A user interface for EMS 242 may be shown on a client accessing EMS 242 as a remote terminal. FIG. 4A illustrates an example of a user interface of EMS 242 for providing multi-objective experiments with dynamic group assignment. For example, assume that user 120B is also an operator of the experiment and has the proper login credentials to access EMS 242. Client 110B may login to EMS 242 and display, on display device 254, a user interface as illustrated in FIG. 4A.

As shown in display device 254A of FIG. 4A, an example configuration component of EMS 242 allows user 120B to specify objectives and constraints for an experiment pertaining to an application, or a game application titled "WIZARD TACTICS." The objectives and constraints may also be listed in an order of priority. Thus, the objectives include 1) improving day 7 retention, 2) increasing session duration, and 3) attaining a 5 star rating. The constraints include 1) a deadline of 2 weeks, and 2) a limitation of using no more than 25% of the user population as the test population. Of course, these are only examples and other objectives and constraints may be provided. Once user 120B is satisfied with the initial parameters of the experiment, the user may click on the "Begin Experiment" button to start the experiment, which results in processor 236 receiving the parameters shown in FIG. 4A.

Figure 4B:
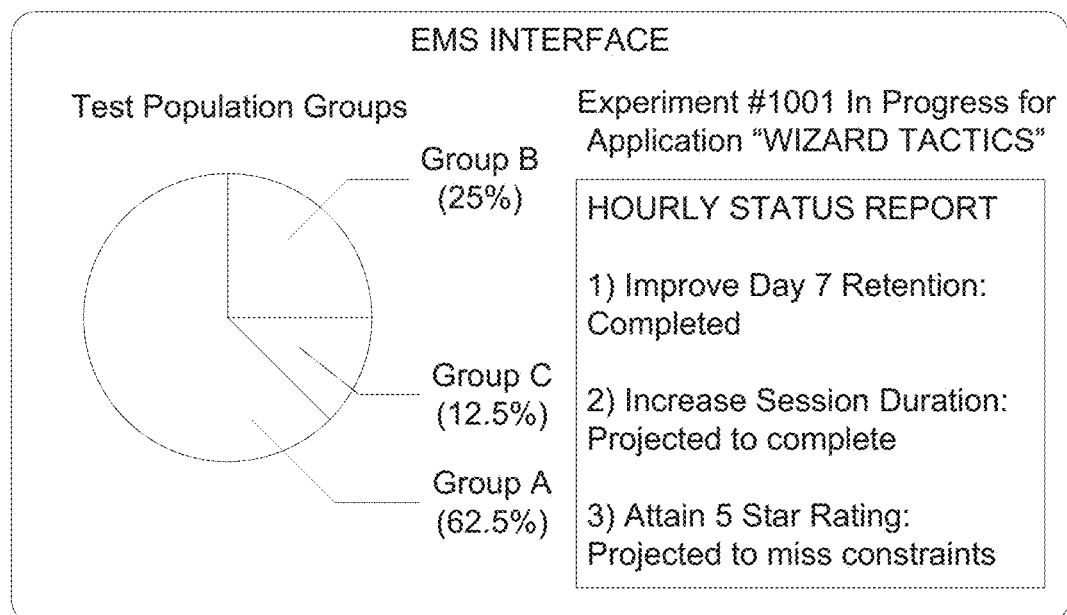

In step 312, processor 236 may assign test population 140 of the experiment into a plurality of groups. For example, FIG. 4B illustrates an example of a user interface of EMS 242 for providing multi-objective experiments with dynamic group assignment. Recall that the constraints include using no more than 25% of the general user population as test population 140; thus, the group assignment shown in FIG. 4B may pertain to a maximum of 25% of the user population for the application. As shown in display device 254B of FIG. 4B, the test population 140 may be divided into three groups A, B, and C, wherein 62.5% of the test population 140 is assigned to group A, 25% of the test population 140 is assigned to group B, and 12.5 of the test population 140 is assigned to group C. The groups A, B, and C may be created for testing and meeting the respective objectives 1, 2, and 3 as listed in FIG. 4A. Thus, clients in group A may be customized to provide data concerning the "Improve Day 7 Retention" objective, clients in group B may be customized to provide data concerning the "Increase Session Duration" objective, and clients in group C may be customized to provide data concerning the "Attain 5 Star Rating" objective. These group assignments, along with other experiment parameters from step 311, may be stored in EMS data 170.

As discussed above, the assignment in step 312 may be based on machine learning methods trained on historical experiment data or other automated methods. Thus, user 120B does not need to manually specify or modify the group assignments shown in FIG. 4B, reducing human error and providing a more disciplined approach for conducting multi-objective experiments. EMS 242 also becomes easier for the experiment operator, or user 120B, to operate. Since user 120B only needs to provide desired objectives and constraints as shown in FIG. 4A, the details of setting up the group assignments and modifying the experiment parameters as shown in FIG. 4B can be abstracted away from consideration by the experiment operator.

In step 313, processor 236 may perform a periodic dynamic group assignment for the plurality of groups. For example, referring again to FIG. 4B, display device 254B may show an example user interface of EMS 242 after the experiment has begun and some time has elapsed. An hourly status report is provided, which indicates that original objective #1 is already completed, objective #2 is projected to complete, and objective #3 is projected to miss the deadline for the experiment. As a result, in step 313, a prioritization of the objectives shown in FIG. 4B may be modified or reordered. For example, a new ordering may have objective #1 for attaining the 5 star rating, objective #2 for increasing session duration, and objective #3 for improving 7 day retention. As a result of the new ordering, group assignments for additional users 145 added into test population 140 may be dynamically assigned according to population targets for each group based on the modified prioritization. Note that the existing assignments for test population 140 may remain as-is, thereby providing a consistent application experience and avoiding sudden changes in customizations from reassigning users from one group to another. The steps carried out by server 130 in step 313 are described in greater detail in conjunction with FIG. 3B below.

Figure 3B:
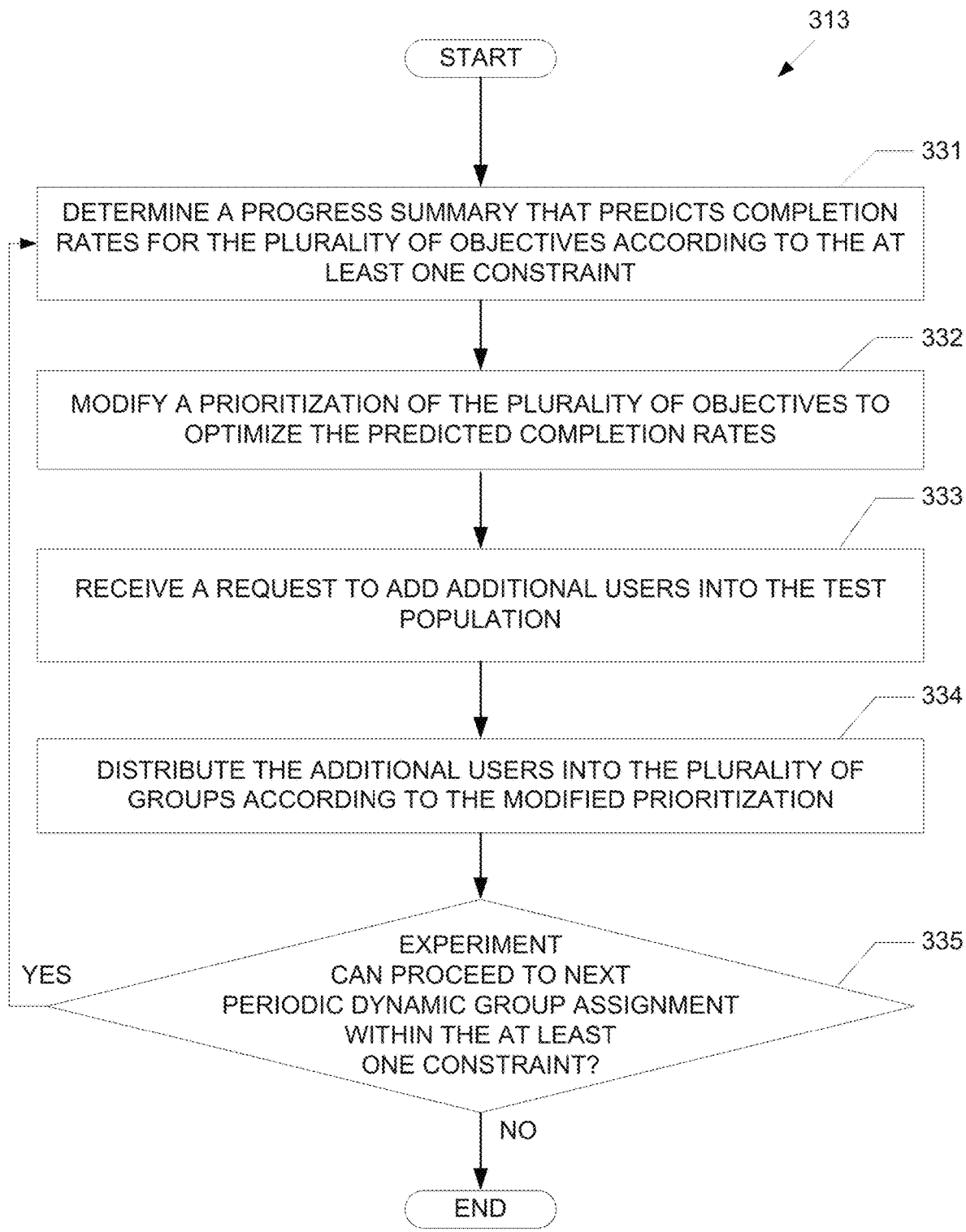
FIG. 3B illustrates an example process for performing a periodic dynamic group assignment for a plurality of groups using an example server of FIG. 2.

FIG. 3B illustrates an example process 313 for performing a periodic dynamic group assignment for a plurality of groups using the example server 130 of FIG. 2. While FIG. 3B is described with reference to FIG. 2, it should be noted that the process steps of FIG. 3B may be performed by other systems.

The process 313 begins by proceeding to step 331, where processor 236 of server 130 may determine a progress summary that predicts completion rates for the plurality of objectives according to the at least one constraint. An example of such a progress summary is shown in display device 254B of FIG. 4B. As discussed above, the progress summary may use data gathered from test population 140 in conjunction with machine learning methods or other techniques to determine the progress summary.

In step 332, processor 236 of server 130 may modify a prioritization of the plurality of objectives to optimize the predicted completion rates. For example, as discussed above, the original ordering of the objectives may be reversed so that objective #3 is now objective #1. Thus, objectives that are in danger of being incomplete according to the restraints may be moved up in the prioritization, whereas objectives that have more leeway for completion or are already completed may be moved down in the prioritization.

In step 333, processor 236 of server 130 may receive a request to add additional users 145 into test population 140. For example, as discussed above, the clients 110 associated with additional users 145 may download the application and request participation in the ongoing experiment.

In step 334, processor 236 of server 130 may distribute additional users 145 into the plurality of groups according to the modified prioritization. For example, now that prioritization of the objectives is reversed, a target population for group A may be set to 0% of test population 140 since the "Improve Day 7 Retention" objective is already completed, a target population for group B may be set to 35% of test population 140 to accelerate the "Increase Session Duration" objective, and a target population for group C may be set to 65% of test population 140 to accelerate the completion of the "Attain 5 Star Rating" objective.

In step 335, processor 236 of server 130 may determine whether the experiment can proceed to the next periodic dynamic group assignment within the at least one constraint. For example, if the next periodic dynamic group assignment falls within the experiment deadline, then the answer is yes and control returns to step 331. However, if the next periodic dynamic group assignment falls past the experiment deadline, then the answer is no and process 313 ends.

Figure 4C:
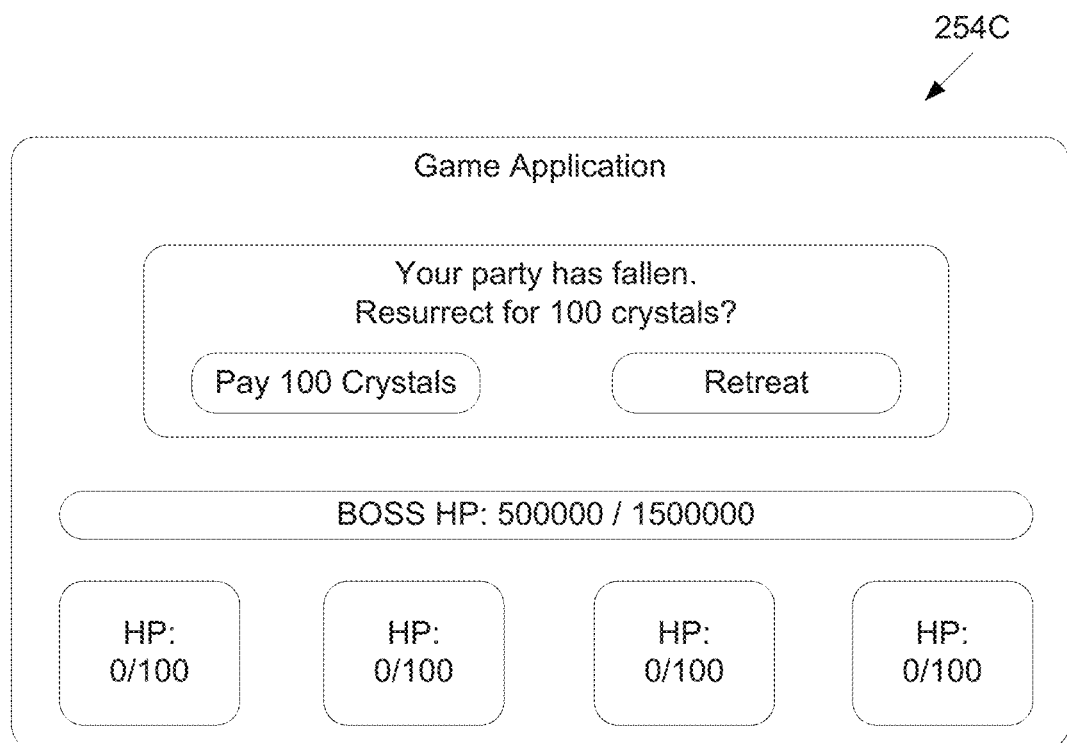
FIG. 4C and FIG. 4D illustrate example user interfaces of an application customized for the plurality of groups to perform experiment testing.
Figure 4D:

FIG. 4C and FIG. 4D illustrate example user interfaces of an application customized for the plurality of groups to perform experiment testing. For example, as discussed above, objective #3, or "Attain 5 Star Rating" may now be the highest priority objective. As a result, new users may be directed towards group C pertaining to this objective. Users in group C may be further subdivided into subgroups, which receive different customizations for the game application. For example, users in subgroup #1 represented by FIG. 4C may receive customizations for a very hard game difficulty, whereas users in subgroup #2 represented by FIG. 4D may receive customizations for a hard game difficulty, and users outside of group C may run the game in a normal, unmodified game difficulty.

As shown in display device 254C of FIG. 4C and display device 254D of FIG. 4D, these customizations may manifest in changed enemy hit points (HP) and other settings. As a result, a user added to subgroup #1 may encounter the defeat message shown in display device 254C, whereas another user added to subgroup #2 may manage to defeat the enemy boss and see the victory screen shown in display device 254D. Based on this, users in subgroup #1 may provide low star ratings for the application in application storefront 152, stating that the difficulty is unbalanced, whereas users in subgroup #2 may provide higher star ratings, stating that the difficulty provides a fair challenge. Low star ratings for users outside of group C may also be noted. For example, natural language processing or other techniques may be used to crawl through ratings for the application on application storefront 152 to determine that users think the unmodified game is too easy and does not require much strategy. These user interactions can be recorded in user account database 180 and EMS data 170, and an analysis may be provided with a conclusion that balancing the game difficulty towards subgroup #2 may help to optimize the star rating of the application towards the desired 5 star rating.

Some groups may provide useful experiment data for objectives that are not specifically assigned to the groups. For example, in a group B for increasing session duration, users may be divided into subgroups that receive different rewards for completing quests, raids, versus matches, or other tasks. Based on these changes, observations can be made for balancing the game towards higher user engagement and longer game play sessions. While experiment data gathered from group B may be helpful for the objective of increasing session durations, this data may also be helpful for 7 day user retention as well, as calibrating a balanced reward and progression system that provides excitement for users may be one important factor for continued user engagement and retention. Accordingly, experiment data for some groups may be used to complete multiple objectives.

Hardware Overview

Figure 5:
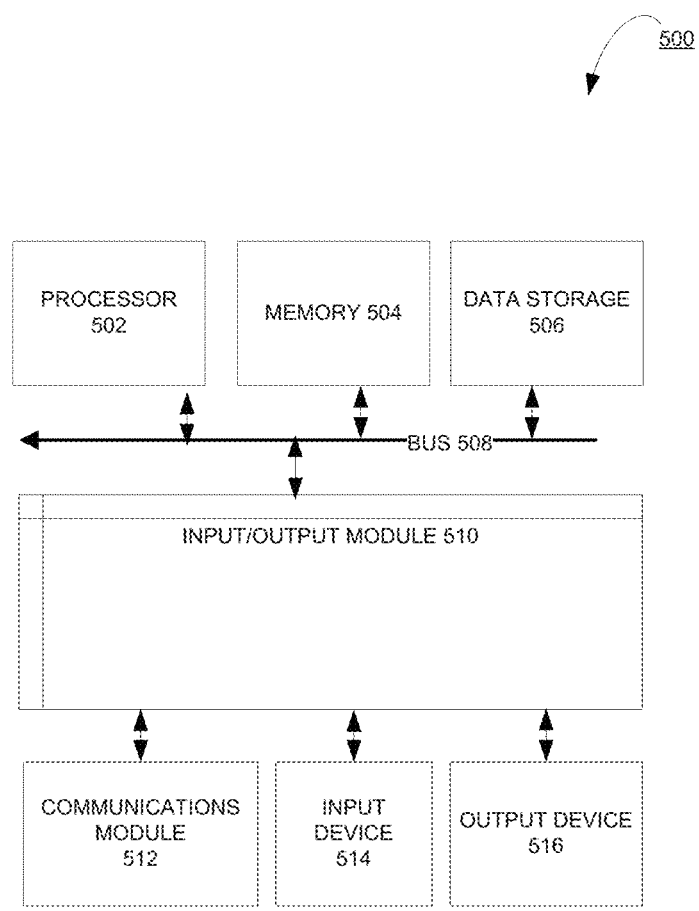
FIG. 5 is a block diagram illustrating an example computer system with which the clients and servers of FIG. 2 can be implemented.

FIG. 5 is a block diagram illustrating an example computer system 500 with which the client 110A, client 110B, and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A, client 110B, and server 130) includes a bus 508 or other communication mechanism for communicating information, and a processor 502 (e.g., processor 212, 252, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 260, and 240), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for providing multi-objective experiments with dynamic group assignment, the method comprising:

receiving, from a configuration component of an experiment management system of a computing device, a plurality of objectives and at least one constraint for an experiment;

training a machine learning algorithm on historical experiment training data for automating assigning and dividing of test populations;

assigning, based on results of the training of the machine learning algorithm, a test population of the experiment into a plurality of groups based at least in part on the historical experiment training data and user consent, the test population comprising a test population data set including user profiles, each user profile comprising an account identifier;

determining a progress summary that predicts completion rates for the plurality of objectives according to the at least one constraint;

modifying a prioritization of the plurality of objectives to optimize the predicted completion rates;

receiving a request to add additional user profiles into newly created groups for the test population;

assigning account identifiers to each of the additional user profiles for the test population data set of the test population;

distributing the account identifiers of the additional user profiles into the newly created groups according to the modified prioritization;

providing for display, through a user interface of the computing device, the configuration component of the experiment management system and the test population data set, the user interface comprising at least a status report of the experiment; and re-training the machine learning algorithm based at least in part on the status report of the experiment.

2. The method of claim 1, wherein assigning the test population is based on the plurality of objectives.

3. The method of claim 1, wherein assigning the test population is based on meeting a minimum confidence level for each of the plurality of objectives.

4. The method of claim 1, further comprising:
providing an application for the test population that is customized for each of the plurality of groups.

5. The method of claim 1, wherein distributing the additional users is for a maximum number of objectives in the modified prioritization.

6. The method of claim 1, wherein the at least one constraint includes a deadline for the experiment.

7. The method of claim 1, wherein determining the progress summary is based on user actions from each of the plurality of groups.

8. The method of claim 1, wherein the determining, the modifying, the receiving, and the distributing are performed on a periodic basis.

9. The method of claim 1, wherein modifying the prioritization is based on meeting a minimum confidence level for each of the plurality of objectives.

10. The method of claim 1, wherein distributing the additional users further creates additional groups for the plurality of groups.

11. A system for providing multi-objective experiments with dynamic group assignment, the system comprising:
a memory; and
a processor configured to execute instructions which, when executed, cause the processor to:

receive, from a configuration component of an experiment management system of a computing device, a plurality of objectives and at least one constraint for an experiment;

train a machine learning algorithm on historical experiment training data for automating assigning and dividing of test populations;

assign, based on results of the training of the machine learning algorithm, a test population of the experiment into a plurality of groups based at least in part on the historical experiment training data and user consent, the test population comprising a test population data set including user profiles, each user profile comprising an account identifier;

provide an application for the test population that is customized for each of the plurality of groups;

determine a progress summary that predicts completion rates for the plurality of objectives according to the at least one constraint, wherein determining the progress summary is based on user actions in the application for each of the plurality of groups;

modify a prioritization of the plurality of objectives to optimize the predicted completion rates;

receive a request to add additional user profiles into newly created groups for the test population;

assign account identifiers to each of the additional user profiles for the test population data set of the test population;

distribute the account identifiers of the additional user profiles into the newly created groups according to the modified prioritization;

provide for display, through a user interface of the computing device, the configuration component of the experiment management system and the test population data set, the user interface comprising at least a status report of the experiment; and re-train the machine learning algorithm based at least in part on the status report of the experiment.

12. The system of claim 11, wherein the processor is configured to assign the test population based on the plurality of objectives.

13. The system of claim 11, wherein the processor is configured to assign the test population based on meeting a minimum confidence level for each of the plurality of objectives.

14. The system of claim 11, wherein the processor is configured to distribute the additional users for a maximum number of priority objectives in the modified prioritization.

15. The system of claim 11, wherein the at least one constraint includes a deadline for the experiment.

16. The system of claim 11, wherein the processor is configured to determine, modify, receive, and distribute on a periodic basis.

17. The system of claim 11, wherein the processor is configured to modify the prioritization based on meeting a minimum confidence level for each of the plurality of objectives.

18. The system of claim 11, wherein the processor is configured to create additional groups for the plurality of groups when distributing the additional users.

19. A non-transitory machine-readable storage medium comprising machine-readable instructions for causing a processor to execute a method for providing multi-objective experiments with dynamic group assignment, comprising:

receiving, from a configuration component of an experiment management system of a computing device, a plurality of objectives and at least one constraint for an experiment;

training a machine learning algorithm on historical experiment training data for automating assigning and dividing of test populations;

assigning, based on results of the training of the machine learning algorithm, a test population of the experiment into a plurality of groups based on the plurality of objectives and the historical experiment training data and user consent, the test population comprising a test population data set including user profiles, each user profile comprising an account identifier;

providing an application for the test population that is customized for each of the plurality of groups;

determining a progress summary that predicts completion rates for the plurality of objectives according to the at least one constraint, wherein determining the progress summary is based on user actions in the application for each of the plurality of groups;

modifying a prioritization of the plurality of objectives to optimize the predicted completion rates;

receiving a request to add additional user profiles into newly created groups for the test population;

assigning account identifiers to each of the additional user profiles for the test population data set of the test population;

distributing the account identifiers of the additional user profiles into the newly created groups according to the modified prioritization;

providing for display, through a user interface of the computing device, the configuration component of the experiment management system and the test population data set, the user interface comprising at least a status report of the experiment; and re-training the machine learning algorithm based at least in part on the status report of the experiment, wherein the determining, the modifying, the receiving, and the distributing are performed on a periodic basis.

\* \* \* \* \*